US012346475B2

(12) United States Patent
Soryal

(10) Patent No.: US 12,346,475 B2
(45) Date of Patent: Jul. 1, 2025

(54) VIRTUAL REALITY PRIVACY PROTECTION

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 425 days.

(21) Appl. No.: 17/747,984

(22) Filed: May 18, 2022

(65) Prior Publication Data

US 2023/0376625 A1 Nov. 23, 2023

(51) Int. Cl.
*G06F 21/62* (2013.01)
*G06V 20/20* (2022.01)

(52) U.S. Cl.
CPC .......... *G06F 21/6245* (2013.01); *G06V 20/20* (2022.01)

(58) Field of Classification Search
CPC ............ G02B 27/017; G02B 2027/014; G02B 27/0093; G02B 27/0172; G02B 2027/0138; G02B 2027/0178; G02B 2027/0134; G02B 2027/0187; G02B 2027/0141; G06F 3/011; G06F 21/32; G06F 3/017; G06F 3/012; G06F 3/0481; G06F 21/6245; G06F 3/04815; G06F 3/013; G06F 21/6254; G06F 3/0482; G06Q 30/0217; G06Q 10/10; G06Q 30/0643; G06Q 30/0601; G06Q 30/0641; G06Q 10/103; G06Q 20/3224; G06Q 20/12; G06Q 10/087; G06Q 10/20; G06Q 20/326; G06Q 20/3276; G06Q 30/06; G06Q 30/0623; G06Q 10/02; G06Q 10/04; G06Q 2220/00; G06Q 30/02; G06Q 30/0201; G06Q 30/0633; G06Q 30/0639; G06Q 10/083; G06Q 10/0833; G06Q 10/0838; G06Q 10/101; G06Q 20/047; G06Q 20/0655; G06Q 20/321; G06Q 30/018; G06Q 30/0267; G06Q 30/0609;

(Continued)

(56) References Cited

U.S. PATENT DOCUMENTS

2019/0213767 A1* 7/2019 Verma ..................... G06T 11/60
2019/0340815 A1* 11/2019 Yildiz ..................... G06F 3/011

(Continued)

FOREIGN PATENT DOCUMENTS

WO   WO-2023041150 A1 * 3/2023 ......... G06F 21/6245

OTHER PUBLICATIONS

Lee, J.C., et al. "Moveable Interactive Projected Displays Using Projector Based Tracking", UIST '05, Oct. 23-27, 2005, 10 pages.

(Continued)

*Primary Examiner* — Chris Parry
*Assistant Examiner* — Abderrahmen Chouat

(57) ABSTRACT

A processing system including at least one processor may obtain a list of a plurality of private items associated with a region of a virtual environment, obtain a data feed of the region of the virtual environment, apply the data feed as an input to a plurality of detection models associated with the plurality of private items, identify at least one of the plurality of private items in the data feed via at least one output of at least one of the plurality of detection models, and transmit a notification to at least one entity that the at least one of the plurality of private items is identified in the data feed.

20 Claims, 3 Drawing Sheets

(58) Field of Classification Search
CPC .... G06Q 30/0631; G06Q 50/10; G06Q 10/08; G06Q 20/065; G06Q 20/123; G06Q 20/308; G06Q 20/3278; G06Q 20/36; G06Q 20/3672; G06Q 20/38215; G06Q 20/40; G06Q 30/0251; G06Q 30/0256; G06Q 30/0261; G06Q 30/0281; G06Q 30/0625; G06Q 50/06; G06Q 50/265; G06Q 10/06; G06Q 10/0631; G06Q 10/06311; G06Q 10/06315; G06Q 10/06375; G06Q 10/0639; G06Q 10/06395; G06Q 10/06398; G06Q 10/08345; G06Q 10/08355; G06Q 10/107; G06Q 20/1235; G06Q 20/3674; G06Q 20/3821; G06Q 20/385; G06Q 20/389; G06Q 20/405; G06Q 20/42; G06Q 30/0202; G06Q 30/0205; G06Q 30/0206; G06Q 30/0207; G06Q 30/0208; G06Q 30/0273; G06Q 30/0276; G06Q 30/0277; G06Q 30/0607; G06Q 30/0621; G06Q 30/0637; G06Q 40/02; G06Q 40/04; G06Q 50/01; G06Q 50/184; G06Q 90/20; G06Q 10/06316; G06Q 10/0637; G06Q 10/0835; G06Q 20/02; G06Q 20/06; G06Q 20/1085; G06Q 20/20; G06Q 20/24; G06Q 20/306; G06Q 20/32; G06Q 20/322; G06Q 20/3223; G06Q 20/327; G06Q 20/342; G06Q 20/367; G06Q 20/382; G06Q 20/386; G06Q 20/387; G06Q 20/4012; G06Q 20/4014; G06Q 20/4016; G06Q 30/0185; G06Q 30/0238; G06Q 30/0244; G06Q 30/0271; G06Q 30/04; G06Q 30/0603; G06Q 30/0611; G06Q 30/0627; G06Q 30/0635; G06Q 30/08; G06Q 40/03; G06Q 40/08; G06Q 50/04; G06Q 50/12; G06Q 50/50; G06Q 99/00; H04W 12/02; H04W 12/33; H04W 4/029; H04W 4/021; H04W 12/08; H04W 4/02; H04W 4/024; H04W 12/06; H04W 84/12; H04W 12/068; H04W 12/069; H04W 12/61; H04W 12/63; H04W 4/027; H04W 4/12; H04W 4/90; H04W 48/04; H04W 64/00; H04W 76/14; H04W 84/18; H04W 84/20; H04W 28/0226; H04W 4/35; H04W 4/38; H04W 4/40; H04W 8/24; H04W 88/08; H04W 12/033; H04W 24/00; H04W 24/08; H04W 24/10; H04W 28/02; H04W 28/06; H04W 4/00; H04W 4/24; H04W 4/44; H04W 48/06; H04W 72/0446; H04W 72/12; H04W 72/51; H04W 72/543; H04W 72/56; H04W 74/0816; H04W 74/0875; H04W 8/22; G06V 10/95; G06V 40/19; G06V 40/193; G06V 20/20; G06V 10/82; G06V 20/10; G06V 40/10; G06V 40/174; G06V 20/52; G06V 20/36; G06V 20/59; G06V 2201/09; G06V 40/172; G06V 10/17; G06V 10/40; G06V 10/70; G06V 10/75; G06V 10/776; G06V 30/10; G06V 30/224; G06V 40/161
See application file for complete search history.

(56) References Cited

U.S. PATENT DOCUMENTS

| | | | |
|---|---|---|---|
| 2020/0383034 A1* | 12/2020 | Oetting | H04W 12/61 |
| 2021/0026441 A1* | 1/2021 | Spivack | G06Q 30/0601 |
| 2023/0237192 A1* | 7/2023 | Kahan | G06V 10/60 |
| | | | 726/1 |

OTHER PUBLICATIONS

Tokyo Tech News, Tokyo Institute of Technology, "In Good Light: A New High-Speed Projector with Visible and Infrared Capabilities", Dec. 13, 2o21, 4 pages. *In Good Light: A New High-Speed Projector with Visible and Infrared Capabilities | Tokyo Tech News | Tokyo Institute of Technology (titech.ac.jp).*

\* cited by examiner

VIRTUAL REALITY PRIVACY PROTECTION

The present disclosure relates generally to virtual reality devices and systems, and more particularly to methods, computer-readable media, and apparatuses for transmitting a notification that a private item is identified in a data feed of a region of a virtual environment in accordance with a plurality of detection models associated with a plurality of private items.

BACKGROUND

Mixed reality (MR), augmented reality (AR), virtual reality (VR), or video-based communication sessions, such as calls, video game environments, group hangouts, and the like may include multiple participants simultaneously experiencing a shared virtual environment. User access devices may include VR headsets, AR headsets, smart glasses, or the like. A user access device may obtain a data feed of a virtual environment simultaneous with other user access devices and may render an experience for a user from a given perspective of that user within the virtual environment. The virtual environment may include fixed or substantially fixed features, e.g., ground, floors, walls, terrain, etc. and movable and/or temporary features, e.g., representations of other users, virtual objects that are moveable within the space of the virtual environment, and so forth.

SUMMARY

In one example, the present disclosure describes a method, computer-readable medium, and apparatus for transmitting a notification that a private item is identified in a data feed of a region of a virtual environment in accordance with a plurality of detection models associated with a plurality of private items. For instance, in one example, a processing system including at least one processor may obtain a list of a plurality of private items associated with a region of a virtual environment, obtain a data feed of the region of the virtual environment, apply the data feed as an input to a plurality of detection models associated with the plurality of private items, identify at least one of the plurality of private items in the data feed via at least one output of at least one of the plurality of detection models, and transmit a notification to at least one entity that the at least one of the plurality of private items is identified in the data feed.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
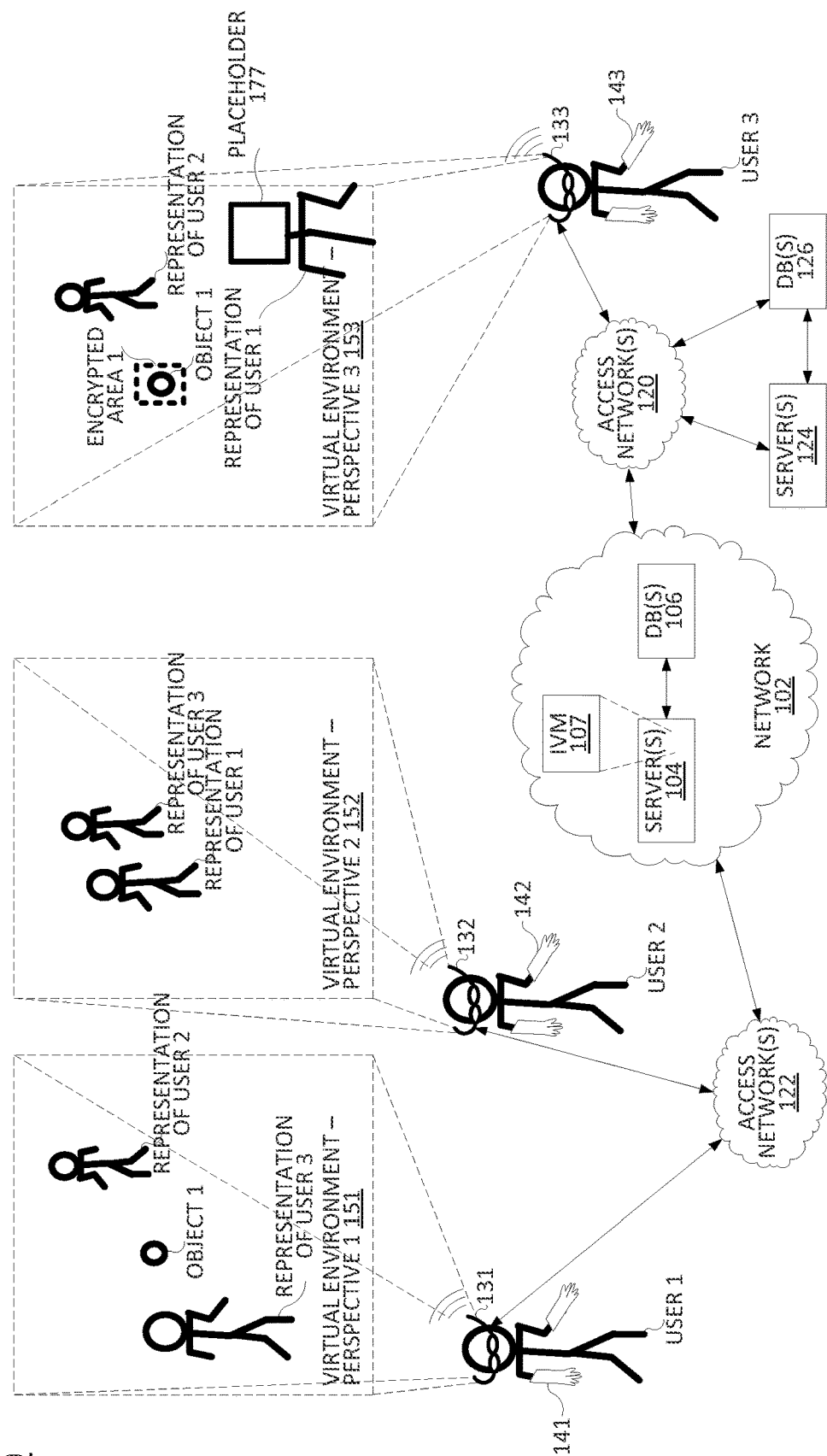
FIG. 1 illustrates an example system related to the present disclosure.

Examples of the present disclosure describe methods, computer-readable media, and apparatuses for transmitting a notification that a private item is identified in a data feed of a region of a virtual environment in accordance with a plurality of detection models associated with a plurality of private items. In particular, examples of the present disclosure provide a monitoring system for tracking and alerting of private/non-public items in a virtual environment (e.g., a VR environment, which may include an augmented reality (AR) environment, an extended reality or mixed reality (MR) environment, and/or a "metaverse" type environment). Notably, users may increasingly spend more and more hours on social media each week. This trend may continue and may even increase for VR experiences as the "metaverse" concept continues to be explored and developed. Online social interactions are already known to facilitate fraud, abuse, and so forth of both a financial and personal nature. Likewise, interactions and other experiences in immersive virtual environments are not immune to these negative factors.

Examples of the present disclosure protect users' privacy aspects such as faces (e.g., of children or other users), documentation sharing and/or exchange of documents (such as legal documents, financial documents, medical records, and so forth), items of a personal nature (such as a valuable collectible that a user may wish some to see, but not others), parts of virtual spaces inside virtual stores and virtual offices (such as an item a user is considering purchasing as a gift), and so forth. In one example, the present disclosure may manually and/or automatically recognize private items, determine authorized users, and restrict access to such private items (e.g., viewing and/or interacting) to such authorized users. In one example, the present disclosure may also enable a user to manually switch or to configure automatic switching between enabling and disabling privacy for an item (e.g., changing the status of the item between private and public) at the user's discretion. For example, a private virtual backstage area in a virtual theater may become a public place after a concert is over. In another example, a child's face may be private until meeting the child's grandparents at a virtual playground.

In one example, the present disclosure provides a monitoring module that audits the implementation of privacy aspects, and which may be referred to herein as an independent verifier module (IVM). In one example, each user device that is used to access a virtual environment (e.g., goggles, computer, camera, etc.) may also be equipped with a privacy protection module (PPM) that may be in communication with the IVM and with one or more servers hosting the virtual environment for implementing user-specific privacy settings for various items. To illustrate, a user, before or during an accessing of a virtual environment, may instruct a PPM on the user device of items that the user may want to keep private during the session (e.g., a "trip" or "visit" within the virtual environment). The user may also specify to the PPM any authorized users (e.g., those to whom the private item(s) may still be made available), optionally, a duration for which to keep a private item private (e.g., keep this document private for the first 10 minutes, then it can be viewed by others), optionally, circumstances that will disable the private mode (e.g., once I say "deal completed," all pertaining virtual documents or virtual structure is made publicly available), and so forth. In one example, manual configuration may take place at the time of virtual building construction where some areas are flagged as private. For instance, a door to a restricted area may be made hidden/private by an owner of the "virtual land," a creator of the virtual building, etc. Similarly, manual configuration may be enabled on-the-fly while a user is in an immersive experience in a virtual environment. For instance, a user may have an item that is currently public, but a location within the virtual environment may be more crowded than the user anticipated. Thus, the user may wish to make the item private after already entering the region of the virtual environment. For example, the user may say "make item X private." In turn, the PPM of the user device may interpret this command and communicate with one or more servers hosting the virtual environment to render item X "private."

In one example, the present disclosure may also include automatic privacy protection features. For instance, over time, a PPM of a user device may learn recurrent patterns of the user, such as visiting a virtual art gallery once a week. In addition, the PPM may learn the user's privacy preference(s) with respect to one or more items. For instance, the PPM may learn that the user will typically make private a virtual watch that is worn by the user's representation (e.g., an avatar, or the like) in the virtual environment while on the way to the zoo, but that the user then removes the privacy protection when entering the virtual art gallery. The PPM can thus autonomously make various items private based on situational awareness, e.g., detecting that the user is likely on the way to the virtual art gallery, detecting that the user is entering the art gallery, etc.

Alternatively, or in addition, the PPM may include voice command and/or speech analysis capabilities so as to detect when a user may wish to make an item private. For instance, a user may meet a friend on a virtual street heading to a virtual party and may say to the friend "I don't want anyone else at the party to see my new big ring." In each case, the PMM may communicate with one or more servers hosting the virtual environment to indicate which items are private and/or to indicate which currently private items should be made public.

In one example, each user may be provided with an independent verifier module (IVM). In another example, an IVM may be deployed and serve a plurality of users (e.g., users having user representations within a region of a virtual environment). In one example, and IVM may operate as a virtual entity that resides in the virtual environment. For instance, an IVM may receive a data feed of a region of the virtual environment as if the IVM were another user/user representation and/or as a camera and microphone with a view into the region of the virtual environment. In particular, an IVM may assume the personality of an unauthorized user and check which items can be seen/not seen. In one example, an IVM may also temporarily assume the personality of an authorized user to see what an authorized user can (or cannot) see. In one example, an IVM may be embodied as a physical server, cluster, or the like, or a virtual machine, container, or the like that is instantiated on one or more servers and that is independent of server(s) hosting the virtual environment (e.g., server(s) that store data of a virtual environment, that aggregate and disseminate data feed(s) for user experiences, and so forth).

An IVM may maintain a list of items that are to be made private/non-public by communicating with the PMM(s) of one or more users to obtain identifications of the user's/users' private items, to receive updates or changes to privacy settings for one or more items (e.g., to change one or more items from private to public, or vice versa, and so on), to notify the PMM(s) of any inconsistencies in what is accessible (e.g., visible) in the data feed obtained by the IVM and the list of items, and so on. Thus, the IVM connects to the PMM of a user requesting a list of any private items and/or requesting privacy settings for one or more items, confirms the privacy configurations, and provides alerts as to the enforcement, correctness, and/or effectiveness of the implementation of such privacy configurations.

In an illustrative example, a virtual building owner may want User 2 to see a storefront, but may prefer that the storefront is not visible to User 1. The virtual building owner may indicate the desire to have the storefront be private to the server(s) hosting the virtual environment. The server(s) may then render the storefront invisible to unauthorized users (e.g., User 1 and others) by encrypting the visual content representing the virtual storefront and including the encrypted visual content as an invisible or near visible light region that can be detected by user devices within the data feed, but that cannot be perceived by human eyes when rendered via a display (e.g., when projected on a screen, via VR goggles, or the like). Alternatively, or in addition, an endpoint device of the virtual building owner (e.g., a PMM thereof) may encrypt the visual content representing the virtual storefront and package the encrypted visual content as a virtual object/item with all pixels, voxels, or the like being within the invisible or near visible light region. The PMM may then provide the encrypted, invisible virtual item/object to the server(s) hosting the virtual environment. The server(s) may include the invisible virtual item/object in the data feed, or data feeds sent to endpoint devices of one or more other users who may have user representations (e.g., avatars) within the region of the virtual environment where the virtual storefront is located.

In one example, the image/visual data of the storefront may be encrypted with an encryption key (e.g., a symmetric key, a key based on a public key infrastructure (PKI), or the like can be used). In addition, a key (e.g., the encryption/decryption key and/or a separate decryption key) may be provided to the user devices of authorized users (and not to the user devices of any unauthorized users). For instance, the decryption key may be provided by the user device of the virtual building owner or by the server(s) hosting the virtual environment. The user devices of both authorized and unauthorized users may detect the invisible or near visible light area, but only the user devices of authorized users can decrypt it to a meaningful image and access features that authorized users can interact with, such as seeing and/or opening a door. In particular, each user device may be configured to recognize invisible light zones, to understand that these zones require decryption, and to decrypt those zones for which the user device may have a decryption key. Thus, once the endpoint device of an authorized user is able to decrypt the item/object, the image/visual data of the virtual storefront can be rendered visible to the user via a display component of the user device. In addition, the authorized user can interact with features in a normal manner. A user device of an unauthorized user may omit invisible items/objects from any projection, or may project the invisible, encrypted items/objects to a display, which will simply be imperceptible to the unauthorized user.

In one example, an IVM may also audit the virtual environment to ensure that private audio data remains private as intended. For instance, User A may wish to talk to User 2 in the presence of User 1, but would like that User 1 not hear (discern) the conversation. For instance, the intended conversation may relate to medical advice, an audible banking transaction, a surprise party, etc. User A may set this privacy setting via a PMM of the user's device, which may be communicated to the server(s) hosting the virtual environment as well as to an IVM. The device of User A (e.g., the PMM thereof) may then encrypt audio data captured via a microphone of the user device, or may provide the audio data to the server(s) hosting the virtual environment for encryption. In one example, the encrypted audio may also be packaged as sub-audible noise. User devices of each user representation within the region of the virtual environment may receive this encrypted audio data as part of the data feed of the region of the virtual environment. The device of User A (e.g., the PMM thereof) and/or the server(s) hosting the virtual environment may provide a decryption key to user devices of authorized users, if any (and not to others).

In one example, recipient user devices may be configured to treat all inaudible/sub-audible sound data as private audio, and may attempt to decrypt such private audio data for which the user device(s) have corresponding decryption key(s). In one example, the authorized user's devices may replace the encrypted audio with the decrypted audio before output via a speaker, headset, or the like. In another example, the authorized user's devices may simply add the decrypted audio to any other audio data for output via a speaker, headset, or the like. For instance, since the encrypted audio data is sub-audible, it would not be heard by a user in any case and would not cause audible interference with the desired audio output. User devices of unauthorized users still will not be able to decrypt the encrypted audio and will perceive the encrypted audio as noise. Again, however, it should be noted that in one example, the encrypted audio is sub-audible and thus will not be heard, even as noise, by an unauthorized user. These and other aspects of the present disclosure are discussed in greater detail below in connection with the examples of FIGS. 1-3.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., in accordance with 3G, 4G/long term evolution (LTE), 5G, etc.), and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 2:
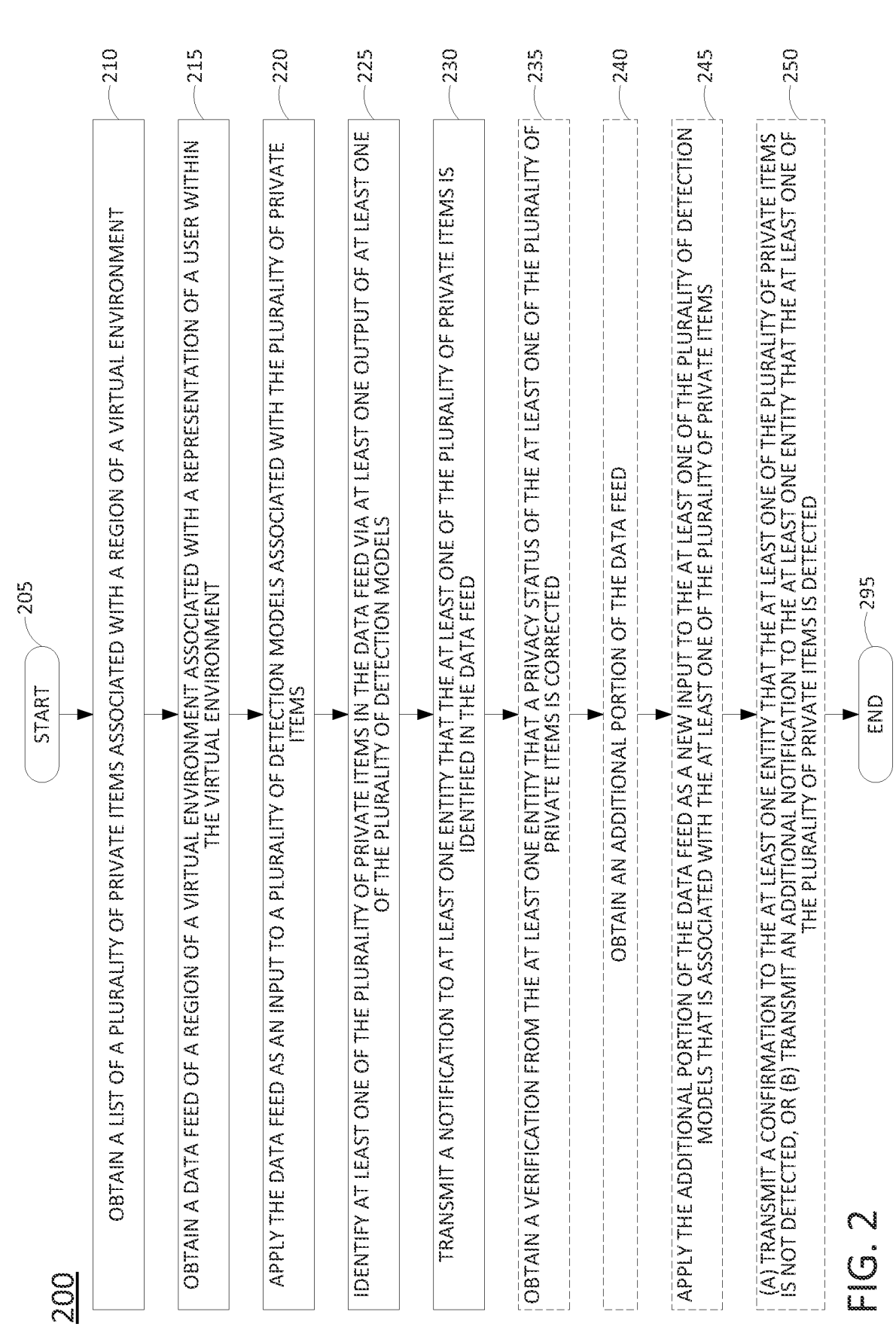
FIG. 2 illustrates a flowchart of an example method for transmitting a notification that a private item is identified in a data feed of a region of a virtual environment in accordance with a plurality of detection models associated with a plurality of private items.
Figure 3:
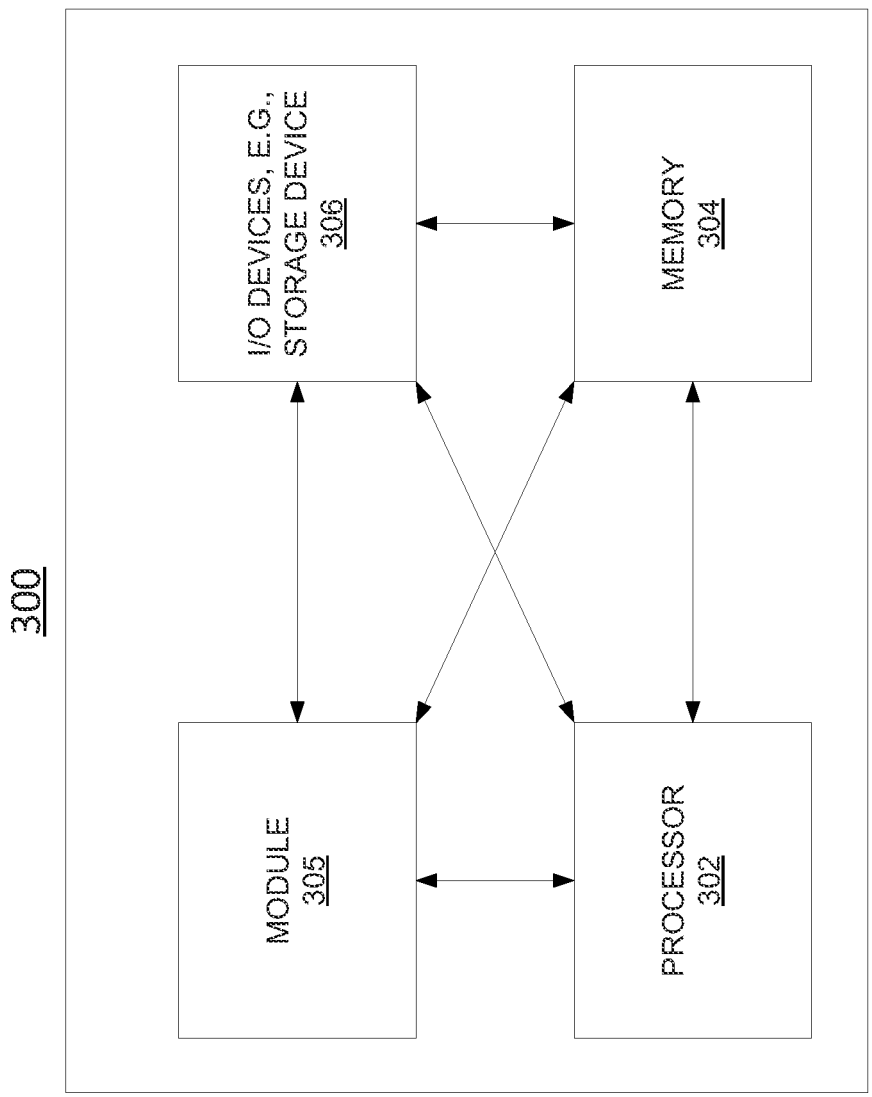
FIG. 3 illustrates an example high-level block diagram of a computing device specifically programmed to perform the steps, functions, blocks, and/or operations described herein.

In accordance with the present disclosure, each of the server(s) 104 may comprise a computing system or server, such as computing system 300 depicted in FIG. 3, and may individually or collectively be configured to provide one or more operations or functions for transmitting a notification that a private item is identified in a data feed of a region of a virtual environment in accordance with a plurality of detection models associated with a plurality of private items, such as illustrated and described in connection with the example method 200 of FIG. 2. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Thus, although only a single server 104 is illustrated, it should be noted that any number of servers may be deployed, and which may operate in a distributed and/or coordinated manner as a processing system to perform operations for transmitting a notification that a private item is identified in a data feed of a region of a virtual environment in accordance with a plurality of detection models associated with a plurality of private items, in accordance with the present disclosure. In one example, server(s) 104 may comprise a VR content server, or "virtual environment server," as described herein. In one example, database(s) (DB(s)) 106 may comprise one or more physical storage devices (e.g., a database server, or servers), to store various types of information in support of systems for transmitting a notification that a private item is identified in a data feed of a region of a virtual environment in accordance with a plurality of detection models associated with a plurality of private items, in accordance with the present disclosure. For example, DB(s) 106 may store object/item detection and/or recognition models, event detection and/or recognition models (which may be used to determine when to automatically change a privacy status of an item), user data (including user device data, privacy settings/preferences for one or more items), and so forth that may be processed by server(s) 104 in connection with examples of the present disclosure. In addition, DB(s) 106 may also store data characterizing a virtual environment, and which may be used for rendering the virtual environment via user endpoint/access devices (e.g., devices 131-133, or the like). For instance, DB(s) 106 may store data characterizing the terrain of a virtual environment, buildings or other structures in the virtual environment, items or objects in the virtual environment, the user representations that may be present in the virtual environment, rules describing how items or objects in the virtual environment may move, how user representations may move through and interact with objects or other user representations in the virtual environment, and so forth. For ease of illustration, various additional elements of network 102 are omitted from FIG. 1.

In one example, the access network(s) 122 may be in communication with one or more devices, such as devices 131 and 132. Similarly, access network(s) 120 may be in communication with one or more devices or systems, e.g., device 133, server(s) 124, DB(s) 126, etc. Access networks 120 and 122 may transmit and receive communications between devices 131-133, and server(s) 124 and/or DB(s) 126, server(s) 104 and/or DB(s) 106, other components of network 102, devices reachable via the Internet in general, and so forth.

In one example, each of the devices 131-133 may comprise any single device or combination of devices that may comprise a user endpoint device (or "user device"). For example, the devices 131-133 may each comprise a wearable computing device (e.g., smart glasses, an AR and/or VR headset, or the like), a laptop, a tablet computer, etc. In one example, each of the devices 131-133 may include one or more radio frequency (RF) transceivers for cellular communications and/or for non-cellular wireless communications. In addition, in one example, devices 131-133 may each comprise programs, logic or instructions to perform operations in connection with examples of the present disclosure for transmitting a notification that a private item is identified in a data feed of a region of a virtual environment in accordance with a plurality of detection models associated with a plurality of private items. For example, devices 131-133 may each comprise a computing system or device, such as computing system 300 depicted in FIG. 3. In one example, devices 131-133 may each include functionality of a privacy protection module (PPM) for virtual environment immersive experiences, as described herein.

Access networks 120 and 122 may transmit and receive communications between such devices/systems, and server(s) 104, other components of network 102, devices reachable via the Internet in general, and so forth. In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and others may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like. In one example, each of access networks 120 and 122 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with devices 131-133 and others.

In an illustrative example, users 1-3 may be engaged within a virtual environment, e.g., hosted by server(s) 104. In other words, users 1-3 may be "immersed" in the virtual environment. Accordingly, in one example, server(s) 104 may provide respective data feeds to devices 131-133 for devices 131-133 to generate different renderings of the virtual environment for users 1-3, respectively. For instance, device 131 may render the virtual environment from perspective 1 (151), device 132 may render the virtual environment from perspective 2 (152), and device 133 may render the virtual environment from perspective 3 (153). Each of the users 1-3 may have a different location and vantage/view within the virtual environment. In addition, each user may appear to others as a user representation (e.g., an avatar such as an anthropomorphized animal or object, a cartoonified representation of the user, such as bitmoji or the like, a different character selected by the user, and so forth, or an accurate three dimensional rendering/model of the user) within the virtual environment. Thus, for instance, user 1 may see a representation of user 3 on the left and a representation of user 2 off in the distance. Similarly, user 3 may see a representation of user 1 on the right and a representation of user 2 in the distance. For instance, users 1 and 3 may be walking side by side in the direction of user 2. On the other hand, user 2 may see representations of users 1 and 3 in the distance. For instance, user 2 may be walking towards users 1 and 3 to meet up. In the present example, the virtual environment may be experienced by users 1-3 from a first-person perspective. However, it should be noted that in other examples, the virtual environment may be experienced in a different manner, such as from a perspective above, below, and/or behind a user representation of a respective user 1-3 (e.g., a "bird's eye view" and the like).

For illustrative purposes, an object 1 is also shown in FIG. 1, e.g., a virtual object that may be moved and interacted with by the representations of users 1-3 within the virtual environment (and which, in one example, may be simulated in the physical world by force feedback gloves 141-143, e.g., via instructions from server(s) 104). For instance, each pair of force feedback gloves 141-143 may include a gyroscope, a compass, one or more accelerometers, and so forth. Force feedback gloves 141-143 may also include a plurality of actuators which may be controllable to provide positive force and/or movement of various portions of the hands of the respective users 1-3 (e.g., electromechanical actuators or motors, electro-hydraulic actuators, electro-pneumatic actuators, etc.). In one example, force feedback gloves 141-143 may also include transceivers for wireless communications, wired communication, etc.

In accordance with the present disclosure, server(s) 104 may include an independent verifier module (IVM) 107. For instance, a first one or more of server(s) 104 may host the virtual environment, while a second one or more of server(s) 104 may host the IVM 107. In other words, the IVM 107 may be a separate and distinct platform from the virtual environment server(s). In another example, the IVM 107 may comprise a separate process (or processes) on a shared hardware platform with the virtual environment host (e.g., the same one or more of server(s) 104). In one example, an IVM 107 may be user-specific. In other words, there may be multiple IVMs hosted by server(s) 104, e.g., one for each user, or one for each user that opts-in to item privacy monitoring and alerting in accordance with the present disclosure.

For illustrative purposes, the IVM 107 may be associated with user 1. Accordingly, in one example, IVM 107 may obtain a data feed pertaining to a region of the virtual environment experienced by user 1 (e.g., the region of the virtual environment in which the representation of user 1 is present). It should be noted that the virtual environment may represent a substantial volume of virtual space. As such, for each of the users 1-3 (and others), the server(s) 104 hosting the virtual environment may provide respective data feeds to devices 131-133 for rendering the virtual environment from perspectives 1-3, respectively. In other words, each data feed may include less than all of the data representing the state of the virtual environment at a given point in time, or times. For example, each of the devices 131-133 may be provided with just enough data to render a respective one of the perspectives 1-3. Any visual or other data beyond the perspective may be omitted from the respective data feed. However, it should be noted that in one example, data for rendering aspects of the virtual environment that are just beyond the view/perspective may also be included in the data feed. For instance, if user 1 (e.g., the representation of user 1) is moving very quickly in the virtual environment or changes the direction of view very quickly, the data feed may include additional data to enable the device 131 to quickly render from the changed perspective. Thus, some data of the feed may go unused for rendering, but may be available if needed depending upon the actions of user 1.

Similarly, the IVM 107 may obtain a data feed for the region of the virtual environment (e.g., representing less than all of the virtual environment). In one example, the data feed may be selected for IVM 107 by the server(s) 104 hosting the virtual environment as if the IVM 107 were another user in the system. For instance, in one example, a view/perspective of IVM 107 may be assumed to be a certain distance in front of and facing the representation of user 1. In another example, the view/perspective of IVM 107 may be assumed to be facing the representation of user 1, but in front of and above the representation of user 1 within a space of the virtual environment (e.g., a "bird's-eye view" facing the representation of user 1). In one example, the view/perspective of IVM 107 may change in relation to a location of the representation of user 1 in the virtual environment. For instance, this may help to enable the IVM 107 to view items/objects from one perspective that may be occluded or hidden from other perspectives.

In one example, a data feed may comprise a volumetric video, a 360 degree video, or the like. In one example, a data feed may comprise visual data for a respective viewport (e.g., for device 131, a view from a current location (or one or more predicted locations)) within the virtual environment and in current direction (or one or more predicted directions of view; for the IVM 107, a view toward the representation of user 1, and at least including the representation of user 1). In one example, the data feed for user 1 may be generated by server(s) 104 by blending data regarding fixed or relatively fixed features of the virtual environment (e.g., terrain, buildings, etc.), with data regarding moveable objects (e.g., object 1) and user representations (e.g., representations of user 2 and 3). Alternatively, or in addition, data regarding fixed or relatively fixed features of the virtual environment may initially be provided to device 131 and to IVM 107. Dynamic features may then be described to device 131 and to IVM 107 via subsequent data of the respective data feeds (e.g., changes in the perspective 1 of user 1, changes in the location of the representation of user 1, and hence corresponding changes in the view/perspective of IVM 107, etc.). In any case, IVM 107 may thus obtain a data feed that provides a view of the representation of user 1 within the virtual environment.

For illustrative purposes, in the example of FIG. 1, the object 1 may be associated with user 1. For instance, object 1 may be a virtual representation of a real, physical object of user 1 that may be recorded by one or more cameras associated with user 1, e.g., an outward facing camera of device 131, another camera, or cameras that may face user 1, such as cameras arranged for capturing image data of user 1, for generating the representation of user 1 in a volumetric video format, or the like, and so forth. As such, the camera(s) may also capture image data of a physical object corresponding to object 1, which may then be provided along with the image data of user 1 to server(s) 104 hosting the virtual environment in order to add the object 1 and the representation of user 1 to the appropriate locations, and with appropriate orientations and so forth within the virtual environment at various points in time, and to include visual data, audio data, and/or other data (such as tactile data) of the object 1 within data feeds that are generated for and provided to various user devices, e.g., devices 131-133, IVM 107, and so on. In another example, object 1 may comprise a pure virtual object that does not reflect any particular real-world physical object. In any case, user 1 may interact with object 1 in the virtual environment, such as carrying object 1, placing object 1 on a table, picking up object 1 from a table, handing object 1 to a representation of another user, and so forth via force feedback gloves 141.

In addition, in accordance with the present disclosure, object 1 may be an object for which user 1 may provide one or more privacy settings, or preferences. For instance, object 1 may be a virtual object of value, such that user 1 does not wish any strangers to see (or interact with) object 1 while user 1 is moving about in the virtual environment. However, user 1 may also wish to allow any friends to still see (and/or interact with) object 1. In one example, user 1 may input a privacy setting for object 1 via PPM of device 131. In one example, the PPM of device 131 may maintain privacy settings for one or more objects associated with user 1 (e.g., including at least object 1). Each time user 1 engages in the virtual environment, the PPM may then provide privacy settings to IVM 107 (e.g., which may be assigned to user 1 upon accessing the virtual environment) and to server(s) 104 hosting the virtual environment. In another example, user 1 may provide a privacy setting for object 1 to IVM 107 and/or to the server(s) 104 hosting the virtual environment directly. Alternatively, or in addition, privacy settings of user 1 (and others) pertaining to virtual objects may be stored by DB(s) 106 and retrieved by server(s) 104 hosting the virtual environment and/or IVM 107 when user 1 engages in the virtual environment.

When user 1 is engaged in the virtual environment, IVM 107 may monitor, on an ongoing basis, the region of the virtual environment in which the representation of user 1 is present to ensure that the privacy settings of user 1 are implemented. In one example, server(s) 104 may obtain the privacy settings of user 1 (e.g., from DB(s) 106 and/or from a PPM of device 131) and may implement such privacy settings in various ways. For example, users may be permitted to select objects/items to be public (e.g., all may view and interact with an item), non-public (e.g., only the user associated with the item (e.g., an item owner, or a user otherwise permitted to be in possession of the item) is permitted to view and interact with the item), semi-private (e.g., only selected users or groups of users are permitted to view and interact with an item), semi-public (e.g., only selected users or groups of users are excluded from viewing an interacting with an item), or the like. In one example, privacy settings may further enable a user to select different settings for an object/item with respect to viewing versus interacting with an item. For instance, other users may be permitted to see but not to touch an object in accordance with a privacy setting of a user.

In the present example, user 1 may select a privacy setting for object 1 of "semi-private." For instance, user 1 may specify that user 3 may see and interact with object 1. Notably, since user 2 is not specifically authorized in accordance with the privacy setting, user 2 may be excluded from viewing and interacting with object 1. Thus, as illustrated in FIG. 1, perspective 2 (152) of the virtual environment for user 2 does not include visual data/imagery of object 1. For example, server(s) 104 hosting the virtual environment may obtain actual or predicted location and viewport information of user 2 (e.g., the representation of user 2) within the virtual environment, and may generate and transmit a data feed to device 132 for user 2. In this case, the data feed may account for any changes in location, orientation, and/or pose of the representations of users 1 and 3, which appear to be within the perspective 2 (152) (as well as any audio data, such as spoken words or other utterances of users 1 and 3, and so forth). However, the server(s) 104 hosting the virtual environment may exclude the visual data (and any other data, such as audio and/or tactile data) relating to object 1 from the data feed for device 132.

In one example, the exclusion of visual or other data for object 1 may be accomplished by encrypting the content (visual data, audio data, tactile data, position, orientation, and/or other data, etc.) of object 1 and including the encrypted content as clear pixels, voxels, or other units comprising at least a portion of the visual information of the data feed. In addition, in one example, the image/visual data of object 1 (and in one example, additional data relating to object 1 such as audio and tactile data) may be encrypted with an encryption key (e.g., a symmetric key, a key based on a public key infrastructure (PKI), or the like can be used). In addition, a key (e.g., the encryption/decryption key and/or a separate decryption key) may be provided to devices of authorized users (e.g., user 3) (and not to the user devices of any unauthorized users (e.g., user 2)). In one example, the encryption may be performed by the server(s) 104 hosting the virtual environment. In another example, the encryption may be performed by device 131 (e.g., the PPM thereof). For instance, the latter example may be permitted in connection with a virtual environment that provides for a greater level of user control (e.g., a more decentralized platform) as opposed to a virtual environment that is more centrally controlled by the host server(s).

The devices of both authorized and unauthorized users may detect the invisible or near visible light zone, but only the devices of the authorized users can decrypt it to a meaningful image and access features that authorized users can interact with (e.g., device 133 of user 3). In particular, each user device may be configured to recognize invisible light zones, to understand that these zones require decryption, and to decrypt those zone for which the user device may have a decryption key. Thus, once the device of an authorized user (e.g., device 133) is able to decrypt the data relating to object 1, the image/visual data of object 1 can be rendered visible to the user 3 via a display component of the device 133. In addition, user 3 (and/or the representation of user 3) can interact with features in a normal manner. On the other hand, a user device of an unauthorized user (e.g., device 132 of user 2) may omit invisible items/objects from projection, or may project the invisible, encrypted items/objects to a display component, which will simply be imperceptible to the unauthorized user 2.

Nevertheless, it should be noted that the foregoing represents a scenario in which the server(s) 104 hosting the virtual environment may implement the privacy setting(s) of user 1 correctly. For example, user 1 may update the privacy setting relating to object 1 at some time or create a new privacy setting for object 1. However, the server(s) 104 hosting the virtual environment may fail to receive the update or new privacy setting directly from a PPM of device 131. Alternatively, or in addition, the server(s) 104 hosting the virtual environment may fail to obtain a correct privacy setting for object 1 from DB(s) 106 either because DB(s) 106 failed to properly obtain the update or new privacy setting from the PPM of device 131, because DB(s) 106 failed to properly store/update the privacy setting even though a change or new privacy setting was received, due to a communication error between the server(s) 104 hosting the virtual environment and DB(s) 106, and so forth. Similarly, the server(s) 104 hosting the virtual environment may fail to properly encrypt the visual data (and/or other data) relating to object 1 before including in the data feed(s) for one or more users.

Accordingly, IVM 107 may be tasked with similarly obtaining one or more privacy settings of user 1 and verifying that the privacy settings are implemented. As noted above, IVM 107 may obtain the privacy settings(s) from device 131 and/or from DB(s) 106. In addition, IVM 107 may obtain a data feed from the server(s) 104 hosting the virtual environment, e.g., from a perspective facing the representation of user 1. In one example IVM 107 may communicate with the server(s) 104 hosting the virtual environment to provide a requested perspective. In another example, server(s) 104 may provide a data feed to IVM 107 wherein the perspective is calculated based upon a current location and/or orientation of the representation of user 1 within the virtual environment. Notably, the IVM 107 may be represented to the server(s) 104 hosting the virtual environment as yet another user, but one which has no permissions. In other words, IVM 107 is a member of the general public within the virtual environment and has no specific permissions to see or interact with any private items. As such, the data feed for IVM 107 should not include object 1 in a visible manner.

In one example, IVM 107 may perform a visual analysis of the data feed in order to determine if any items/objects that should be private are nevertheless detectable within the visual portion of the data feed. For example, DB(s) 106 may store object/item detection and/or recognition models that may be used by IVM 107. For instance, IVM 107 may have a list of items/object that are currently subject to one or more restrictions in accordance with one or more privacy settings. To illustrate, in one example, any object/item that is "private," "semi-private," or "semi-public" should be encrypted and may be included within data feeds of the virtual environment as clear/invisible data (e.g., a block or other regions of clear or sub-visible pixels, voxels, etc.). For private items, only a device of an authorized user should be provided a decryption key. For semi-private items, only devices of the authorized user and devices of any other users being designated to have access should be provided with the decryption key, and so forth. IVM 107 may then retrieve and deploy detection models corresponding to the items/objects that are "private," "semi-private," or "semi-public" (e.g., including at least object 1, which in the present example may be "semi-private"). If any such item is detected by IVM 107 in accordance with the one or more detection models, this means that the item is not properly encrypted and that the "private," "semi-private," or "semi-public" status has not been maintained.

To illustrate, server(s) 104 and/or IVM 107 may generate (e.g., train) and store detection models that may be applied by IVM 107 (and/or other IVMs), in order to detect items/objects in data feeds relating to the virtual environment. For instance, in accordance with the present disclosure, the detection models may be specifically designed for detecting types of items or specific items (e.g., a family heirloom, a one-of-a-kind or limited edition work of art, etc.). The detection models, or signatures, may be specific to particular types of visual/image and/or audio data in the data feed. For instance, with respect to a detection model that uses visual input, the input data may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video or other visual sequences (e.g., visual aspects of a data feed of a virtual environment) and may include changes within images and between images in a sequence (e.g., video frames or a sequence of still image shots), such as color histogram differences or a change in color distribution, edge change ratios, standard deviation of pixel intensities, contrast, average brightness, and the like.

In accordance with the present disclosure, a detection model may comprise a machine learning model (MLM) that is trained based upon the plurality of features available to the system (e.g., a "feature space"). For instance, one or more positive examples for a feature may be applied to a machine learning algorithm (MLA) to generate the detection model, or "signature" (e.g., a MLM). In one example, the MLM may comprise the average features representing the positive examples for an event or object in a feature space. Alternatively, or in addition, one or more negative examples may also be applied to the MLA to train the MLM. The machine learning algorithm or the machine learning model trained via the MLA may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, a trained detection model may be configured to process those features which are determined to be the most distinguishing features of the associated item/object, e.g., those features which are quantitatively the most different from what is considered statistically normal or average from other items/objects that may be detected via a same system, e.g., the top 20 features, the top 50 features, etc.

In one example, detection models (e.g., MLMs) may be trained and/or deployed by IVM 107 (and/or other IVMs) to process a data feed associated with user 131 (or another user for a different IVM) to identify patterns in the features of the data feed that match the detection model(s) for the respective object(s). In one example, a match may be determined using any of the visual features mentioned above, e.g., and further depending upon the weights, coefficients, etc. of the particular type of MLM. For instance, a match may be determined when there is a threshold measure of similarity among the features of the visual data from the data feed of user 1 and an object signature. Similarly, in one example, IVM 107 may apply an object detection and/or edge detection algorithm to identify possible unique items in visual data of the data feed related to user 1 (e.g., without particular knowledge of the type of item; for instance, the object/edge detection may identify an object in the shape of a shovel in the visual data, without understanding that the object/item is a shovel). In this case, visual features may also include the object/item shape, dimensions, and so forth. In such an example, object recognition may then proceed as described above (e.g., with respect to the "salient" portions of the visual data).

In the present example, object 1 may be a gift for user 2 that user 1 does not wish user 2 to see yet, such as a new virtual hat that may be worn by the representation of user 2. In this case, the IVM 107 may apply a corresponding detection model for "hat" to the visual content of the data feed obtained by IVM 107. In one example, no hat may be detected, and thus IVM 107 may confirm that the privacy setting for object 1 appears to be implemented correctly by the server(s) 104 hosting the virtual environment. However, for illustrative purposes, in one example IVM 107 may detect via the corresponding detection model that a hat is present in the visual content of the data feed. In this case, IVM 107 may then generate one or more alerts, and transmit the one or more alerts to device 131 (e.g., the PPM thereof) and/or the server(s) 104 hosting the virtual environment. The alert(s) may indicate the object/item detected, the corresponding privacy setting as understood by IVM 107 (e.g., the privacy setting that the IVM 107 has recorded as being current/active), and so forth.

In one example, server(s) 104 hosting the virtual environment may then verify the privacy setting with device 131 (e.g., the PPM thereof). In addition, in one example, server(s) 104 may seek to correct the error by encrypting the visual data (and/or other data) of object 1 for inclusion in data feeds of the virtual environment for subsequent time periods. In one example, server(s) 104 may be configured to transmit a notice of correction of the error to IVM 107 (and/or to device 131 (e.g., the PPM thereof)). Accordingly, in one example, IVM 107 may continue to apply the detection model for "hat" to subsequent portions of the data feed being obtained from server(s) 104 hosting the virtual environment. When a "hat" is not detected in accordance with the detection model (e.g., over a time block or quantity of data feed, such as over 5 seconds, over 50 frames, etc.), IVM 107 may confirm that the error is corrected and that the privacy setting for object 1 appears to now be implemented correctly. Additionally, in one example, IVM 107 may communicate the finding that the error is corrected to device 131 (e.g., the PPM thereof) for presentation to user 1 (such as an audible alert, a visual alert, such as a temporary pop-up and/or overlay window, or the like).

It should be noted that FIG. 1 further illustrates a perspective 3 (153) of user 3 within the virtual environment in which object 1 may be presented to user 3 via device 133. For instance, device 133 may receive a respective data feed of the virtual environment for user 3, which may include a representation of user 2, an area of encrypted clear/invisible visual data representing object 1 ("encrypted area 1"), etc. In addition, device 133 may receive a corresponding decryption key as part of the data feed or as a separate communication from device 131 and/or from server(s) 104 hosting the virtual environment. In this case, device 133 may render the perspective 3 for display via a display component in accordance with the data feed that is obtained. However, device 133 may be configured to treat any areas of clear/invisible visual content (e.g., a contiguous area of clear/invisible pixels, voxels, etc.) as an area that may contain a hidden item/object. Thus, for example, device 133 may attempt to decrypt the content with any decryption keys in possession of device 133 (there may be multiple keys for multiple areas that may have hidden items). As such, device 133 possessing the decryption key for encrypted area 1 may decrypt the content and may overlay the visual content of object 1 within the corresponding location within perspective 3. In addition, device 133 may further enable user 3 to interact with object 1 in the virtual environment, e.g., via gestures/movements and tactile feedback via force feedback gloves 143.

Advantageously, the server(s) 104 hosting the virtual environment does not need to determine which items/object should be included and excluded for each data feed for each user separately. Rather, server(s) 104 may simply look to whether there is any privacy setting in effect for an object (e.g., private, semi-private, or semi-public) and if so, the item may be encrypted. In one example, the decryption key may be provided by server(s) 104 hosting the virtual environment to the corresponding user device (e.g., a PPM of device 131), which may further transmit the decryption key to devices of other authorized users (e.g., device 133), thus further relieving server(s) 104 from such tasks. Notably, server(s) 104 may maintain a heavy processing load just to receive locations and viewing directions (e.g., viewports) of different users and to provide data feeds corresponding to such viewports. Thus, the present examples are able to provide for customizable privacy settings for different items while placing little to no additional burden on the host server(s).

FIG. 1 further illustrates that items/objects for which privacy settings may be user-specified are not limited to independent items/objects, but may also include parts of a user representation. For instance, user 1 may wish to temporarily hide the face of the representation of user 1 from user 3. In other words, the face of the representation of user 1 may be "semi-public" and only excluded from view by user 3. For example, user 1 may have selected a new hairstyle for the representation of user 1, but may wish to gain the opinion of user 2 or others before revealing the new hairstyle to user 3. In this case, the face of the representation of user 1 may be encrypted and included in data feeds for various users as clear/invisible area. However, in another example, due to the unique nature of human faces and the way in which such faces are perceived by others, in one example, the area may instead be replaced by a generic face/placeholder. In one example, the generic face/placeholder may be a cue to user devices that the region is hiding a true face and should be attempted to be decrypted. Thus, for example, the device 132 of user 2 may be provided with the decryption key, but the device 133 of user 3 may not. As such, device 132 may scan the visual data, may detect a region containing a generic face/placeholder 177 (only as shown in perspective 153), may decrypt the region with the corresponding decryption key, and may render perspective 2 (152) for presentation via a display component of device 132. On the other hand, device 133 may detect the area of the generic face/placeholder 177, and may attempt to decrypt the area, but lacking the correct decryption key, device 133 may fail. As such, perspective 3 (153) may be rendered with the generic face/placeholder 177 (i.e., the true face of user 1 cannot be decrypted and displayed).

As noted above, users may change privacy settings for items/objects, and/or may create new privacy settings (e.g., for new items/objects and/or for items/object not previously having a setting other than "public," and so forth). Alternatively, or in addition, the present disclosure may provide user privacy settings to further comprise automatic triggers for changing of privacy statuses of one or more items. For instance, in one example, user 1 may specify certain locations within the virtual environment for which an item is to be made private, semi-private, semi-public, etc. In one example, the PMM of device 131 may track the location of the representation of user 1 within the virtual environment and when one of such designated locations is encountered, the PPM may notify server(s) 104 and IVM 107 of the corresponding change in the privacy setting(s) for one or more objects/items (e.g., to "private," "semi-private," or "semi-public"). When the PPM of device 131 detects that the representation of user 1 departs from such a location, the PPM may notify server(s) 104 and IVM 107 of the corresponding change in the privacy setting(s) for one or more objects or items (e.g., back to "public").

It should be noted that an automatic trigger is not necessarily location-based, but may be based upon types of places, certain events, or other criteria, such as a duration of time in which user 1 is engaged in the virtual environment, the presence of the representation of user 1 at a concert or virtual sporting event, the presence of a particular other user representation, and so forth. In this regard, it should be noted that PPMs, such as the PPM of device 131 may implement various event detection models, which may comprise additional machine learning models trained in accordance with visual data to detect different events, scenes, or other semantic content, such as "concert," "sporting event," "school," "raining," etc. It should again be noted that the detection models may be virtual environment-specific insofar as different semantic content may be characterized differently in different virtual environment. For example, fire and rain may have a substantially different appearance in a first virtual environment versus as a second virtual environment, even though all may be equally well perceived by an average users to be "fire," "rain," etc. In one example, the PPM of device 131 may obtain the event detection model(s) from DB(s) 106. For instance, the detection model(s) may be trained by one or more of server(s) 104 and stored in DB(s) 106 for provisioning to different user devices. In one example, the PPM of device 131 may detect an event that is a trigger for changing a privacy setting of one or more items, and may notify server(s) 104 and IVM 107 of the corresponding change in the privacy setting(s) for the one or more objects or items in the same or similar manner as described above.

Similarly, in one example, a PMM (such as a PPM of device 131) may learn a user's privacy preferences over time and may automatically generate a privacy setting and/or automatic trigger relating to a privacy setting for an item. For instance, the PPM of device 131 may learn that user 1 typically hides a virtual bag of user 1 when travelling between a virtual home and stores in the virtual environment. As such, the PPM may generate a privacy setting for the virtual bag and/or a trigger condition for such a privacy setting, e.g., "when travelling between home and a store, 'bag' is 'private'". The detection of the triggering context may thus cause the PPM to notify server(s) 104 and IVM 107 of the corresponding change in the privacy setting(s) for one or more objects or items in the same or similar manner as described above.

It should be noted that the foregoing and FIG. 1 illustrate just several representative examples, and that other, further, and different examples may readily be provided in accordance with the present disclosure. In addition, although the foregoing example(s) is/are described and illustrated in connection with a single virtual environment, it should again be noted that in one example, users and their privacy settings may be tracked across several virtual environments, e.g., by the same or different IVM. In one example, IVM 107 may adjust the use of various detection models accordingly (e.g., to use the virtual environment-specific detection models that are tuned to the characteristics of the virtual environment). For example, the same real world/physical object may appear differently in different virtual environment, e.g., due to pixilation, filtering, or other transformations. Thus, a virtual environment-specific detection model may be better able to detect such object in a particular virtual environment.

In one example, the IVM 107 may be provided with data feeds representing several views of the representation of user 1, such as akin to a computed tomography (CT) scan or obtaining a set of magnetic resonance imaging (MRI) images. For instance, the IVM 107 may apply detection models to visual data from several perspectives, any of which may result in the detection of an item/object that should be hidden in accordance with one or more privacy settings. In another example, IVM 107 may apply one or more detection models to contemporaneous visual data from several perspectives (e.g., multiple inputs to each of the one or more detection models). In one example, operations or functions described above with respect to PPMs of user devices may alternatively or additionally be deployed to IVM 107. For instance, IVM 107 may apply location-based, event-based, or other triggers for automatically changing privacy settings and may notify server(s) 104 hosting the virtual environment of the corresponding change(s). Similarly, IVM 107 may learn user preferences over time in order to generate privacy settings and/or corresponding rules for automatically changing privacy settings, and so forth.

It should also be noted that the example of FIG. 1 illustrates just one example of user devices that may be used to interact with/experience a virtual environment. As such, it should be noted that in other, further, and different examples, users may alternatively or additionally interact with and experience a virtual environment using fans, heating and/or cooling elements, e.g., climate control systems, network-connected cycles, shoes, and or treadmills, a network of body worn sensors to more precisely detect movements of limbs, and so forth.

It should also be noted that the system 100 has been simplified. In other words, the system 100 may be implemented in a different form than that illustrated in FIG. 1. For example, the system 100 may be expanded to include additional networks and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server(s) 104 and/or IVM 107 may alternatively or additionally be performed by server(s) 124, and vice versa. In this regard, DB(s) 126 may store the same or similar information as DB(s) 106 as described above. Similarly, although the foregoing is described in connection with IVM 107 being part of server(s) 104, in another example, IVM 107 may instead be installed as a standalone module within one of the devices 111-113, as a third-party service, or the like. In one example, a PPM and IVM may be combined into a single functional entity provided via one of the devices 111-113 and/or hosted on one or more network-based servers.

In addition, although a single server 104 and a single server 124 are illustrated in the example of FIG. 1, in other, further, and different examples, the same or similar functions may be distributed among multiple other devices and/or systems within the network 102, access network(s) 120 or 122, and/or the system 100 in general that may collectively provide various services in connection with examples of the present disclosure for transmitting a notification that a private item is identified in a data feed of a region of a virtual environment in accordance with a plurality of detection models associated with a plurality of private items. Additionally, devices that are illustrated and/or described as using one form of communication (such as a cellular or non-cellular wireless communications, wired communications, etc.) may alternatively or additionally utilize one or more other forms of communication. Thus, these and other modifications are all contemplated within the scope of the present disclosure.

FIG. 2 illustrates a flowchart of an example method 200 for transmitting a notification that a private item is identified in a data feed of a region of a virtual environment in accordance with a plurality of detection models associated with a plurality of private items. In one example, steps, functions and/or operations of the method 200 may be performed by a device or apparatus as illustrated in FIG. 1, e.g., by server(s) 104 and/or servers(s) 124, such as an integrity verification module (IVM), or any one or more components thereof, or by server(s) 104 and/or servers(s) 124, and/or any one or more components thereof in conjunction with one or more other components of the system 100, such as devices 131-133, and so forth. In one example, steps, functions and/or operations of the method 200 may be performed by a user device as illustrated in FIG. 1, e.g., such as by one of the devices 131-133, or any one or more components thereof, or by devices 131-133, and/or any one or more components thereof in conjunction with one or more other components of the system 100, and so forth. In one example, the steps, functions, or operations of method 200 may be performed by a computing device or processing system, such as computing system 300 and/or hardware processor element 302 as described in connection with FIG. 3 below. For instance, the computing system 300 may represent any one or more components of the system 100 that is/are configured to perform the steps, functions and/or operations of the method 200. Similarly, in one example, the steps, functions, or operations of the method 200 may be performed by a processing system comprising one or more computing devices collectively configured to perform various steps, functions, and/or operations of the method 200. For instance, multiple instances of the computing system 300 may collectively function as a processing system. For illustrative purposes, the method 200 is described in greater detail below in connection with an example performed by a processing system. The method 200 begins in step 205 and proceeds to step 210.

At step 210, the processing system obtains a list of a plurality of private items associated with a region of a virtual environment. For instance, in one example, the processing system may comprise an integrity verification module (IVM) as described herein, and may obtain the list of a plurality of private items from one or more user devices and/or one or more privacy protection modules (PPMs) thereof. In another example, the processing system may comprise a user device, where the list may be obtained in accordance with one or more user inputs selecting items that are to be made "private," "semi-private," and/or "semi-public." In one example, the region of the virtual environment may be associated with a representation of a user within the virtual environment. For instance, the processing system (e.g., an IVM) may be assigned to the user (where other users may be assigned other respective IVMs). In another example, the IVM may be assigned to the region of the virtual environment and may provide privacy verification for any users having user representations within the region of the virtual environment.

In one example, the list may include one or more entries for one or more items. For instance, each entry may include an identification of the item and/or item type, a corresponding privacy setting (e.g., "public," "private," "semi-private," "semi-public," or the like), authorized users or groups of users (e.g., for a semi-private setting), and/or unauthorized users or groups of users (e.g., for a semi-public setting). In one example, an entry may further include one or more trigger conditions for activating and/or deactivating, or otherwise changing a privacy setting for an item. In this regard, it should be noted that "activating" may comprise changing from a "public" setting to any of a "private," "semi-private," or "semi-public" setting, for example. Similarly, "deactivating" may comprise changing from any of a "private," "semi-private," or "semi-public" setting to a "public" setting, for example. In one example, step 210 may include learning at least one of the plurality of private items from usage data from the virtual environment associated with at least one user. For instance, the processing system may learn which items the user manually selects to make private and then looks for those private items when such users are present.

At step 215, the processing system obtains a data feed of a region of a virtual environment. In one example, the region of the virtual environment may be associated with a representation of a user within the virtual environment. For instance, as noted above the processing system may comprise an IVM that is assigned to the user, where the representation of the user may currently be located within the region of the virtual environment. Alternatively, the processing system may comprise an IVM that is assigned to the region, where the representation of the user may currently be located within the region of the virtual environment. In one example, the processing system may be a processing system of an endpoint device of the user that is used to access the virtual environment, where the representation of the user may currently be located within the region of the virtual environment. In any case, the data feed may be obtained from a server, or servers, hosting the virtual environment. In another example, the processing system may comprise a processing system of a server hosting the virtual environment and the method 200 may be performed via at least one first process that is distinct from at least one second process that is for hosting the virtual environment. In such case, the at least one second process may provide the data feed of the region of the virtual environment. In still another example, the processing system may be a processing system of a first server and the virtual environment may be hosted via at least a second server, where the at least the second server provides the data feed of the region of the virtual environment.

The representation of the user may comprise an avatar, such as anthropomorphized animal or object, a cartoonified representation of the user, such as bitmoji or the like, a different character selected by the user, and so forth. It should be noted that the server(s) hosting the virtual environment may provide the structure of the virtual environment via the data feed (e.g., permanent or semi-permanent features such as ground/terrain, buildings, trees, etc.), as well as transitional features of the virtual environment (e.g., representations of users, their movements, sounds, interactions with each other, etc., other moveable items/objects that are purely virtual or are representations of real world objects that are interacted with by one or more users and simulated via the interactions of the representation(s) of the user(s) with one or more virtual objects representing the real-world object(s), and so forth). It should also be noted that the data feed may include one or more private items, e.g., as clear/invisible/sub-visible visual area(s), such as an area of contiguous pixels, voxels, or the like (and may include one or more items that are intended to be private, but that may be ineffectively or incompletely made private in actual implementation).

In one example, the second server may receive respective upload feeds from one or more user endpoint devices (e.g., describing the movements and actions, speech, and other user inputs) and may merge the received upload feeds or aspects of the received upload feeds to represent a current state of the virtual environment. From the state of the virtual environment, the server(s) may then generate user-specific data feeds for the respective user devices to render the experience of the virtual environment for a respective user. Thus, for example, the data feed may be selected to include visual and audio data from a region of the virtual environment in which a user (e.g., the representation of the user) is currently located. In one example, the visual data may comprise visual data from a perspective, field-of-view, or "viewport" of the user (and may exclude visual data that is not currently within the field-of-view, or not anticipated to be within the field-of-view according to a prediction algorithm).

However, as noted above, an integrity verification module (IVM) may receive a data feed that includes visual data from one or more perspectives facing the representation of the user, e.g., a head-on view, a birds-eye view, etc. Thus, the data feed obtained at step 210 may include visual data from one or more of such perspectives. It should be noted that the data feed may include multiple communications from the server(s) hosting the virtual environment. In one example, the data feed may provide initial data to render the fixed or relatively fixed features in the region of the virtual environment, while subsequent portions of the data feed may include additional data for rendering transitional features. It should also be noted that the term "data feed" may include visual and/or audio data (and may further include other data, such as tactile information, etc.) received on an ongoing basis over a period of time, e.g., for continuous privacy setting monitoring for one or more items in the list.

In still another example, the virtual environment may not be centrally hosted by any server, or servers. Instead, the virtual environment may be rendered individually by different endpoint devices, where the endpoint devices communicate with each other as peers to provide updated information of different user representations and/or items being manipulated by such user representations (e.g., location, pose, trajectory, etc.). In such case, the processing system may participate as a peer in the system in order to provide privacy setting verification on behalf of one or more users. Thus, in one example, at least a first portion of the list is obtained from a first user endpoint device of a plurality of user endpoint devices that are engaged in generating the region of the virtual environment (for the respective users separately via the plurality of user endpoint devices). For example, a first user endpoint device may be a device via which a first user accesses the virtual environment. In addition, a representation of the first user may be present in the region of the virtual environment (e.g., the representation is visible to other users, and in one example, may be visible to the first user, such as for a birds-eye view experience, rather than a first-person view/experience). In one example, at least a second portion of the list may be obtained from a second user endpoint device of the plurality of user endpoint devices. For instance, as noted above, the processing system may provide a privacy setting verification service to multiple users.

At step 220, the processing system applies the data feed (e.g., at least a portion thereof) as an input to a plurality of detection models associated with the plurality of private items. In one example, each the plurality of detection models associated with the plurality of private items in the list is activated when a respective user associated with the private item is engaged in the region of the virtual environment via a respective user endpoint device. In one example, the detection model(s) may be retrieved from a repository for activation (e.g., one or more database servers that may be part of and/or accessible to the processing system). In one example, at least one of the plurality of private items is a virtual object representing a physical object recorded via a user endpoint device that is used to access the virtual environment e.g., an object on a shelf in front of or behind user, on object being held by the user, etc. For instance, the user endpoint device may comprise a headset with an outward facing camera or may comprise a plurality of cameras arranged as part of a user system (e.g., one or more cameras deployed in a physical room in which the user is physically present).

The detection model(s) may comprise machine learning models that are trained in accordance with training data to detect different items in the visual data such as "hat," "ball," "shovel," "watch," "bracelet," "documents," "dog," "cat," etc. In one example, the detection models may be further trained in accordance with training data that include audio data. For instance, an item may be more accurately classified as a dog when visual data is combined with audio data that may include the sound of a barking dog. In one example, the training data may be virtual environment-specific. For example, the processing system may provide a privacy setting verification service for a user across multiple virtual environments, which may each have unique representations of different items. For instance, a user may be wearing a physical watch, which may be recorded via one or more cameras and added to the virtual environment in connection with the representation of the user. However, the "watch" may be filtered, transformed, etc. (such as cartoonified) differently in one virtual environment versus another. Thus, a detection model for "watch" that is trained on examples of "watches" from the one virtual environment may be more accurate in detecting and/or classifying new examples of watches within a data feed of such virtual environment, and likewise for a detection model that is trained for a second virtual environment for detecting new examples of watches within such second virtual environment.

At step 225, the processing system identifies at least one of the plurality of private items in the data feed via at least one output of at least one of the plurality of detection models. For instance, as noted above, the privacy setting of one or more private items may be improperly or incompletely implemented. Thus, for example, a private item, such as a baseball, "should" have been encrypted and included in the data feed as an area of clear/invisible data (e.g., a block or other region of clear or sub-visible pixels, voxels, etc.). However, the baseball may instead be included in the data feed "in the clear" and may be detected in the visual content (and/or visual content in conjunction with audio content, for instance) via a respective detection model. For instance, an output of a detection/classification model for "baseball" may indicate that a "baseball" is detected (e.g., identifiable or visible) in the visual content (and/or visual content in conjunction with audio content). In one example, at least a second one of the plurality of private items may be encrypted and included as an invisible light area in the data feed of the region of the virtual environment. For instance, the at least the second one of the plurality of private items may be correctly encrypted and included in the data feed in a manner that is imperceptible to unauthorized users (and to the processing system via one or more corresponding detection model(s)).

At step 230, the processing system transmits a notification to at least one entity that the at least one of the plurality of private items is identified in the data feed, e.g., in response to the identifying of step 225. For instance, the at least one entity may comprise an endpoint device of a user that is used to access the virtual environment and/or at least one server hosting the virtual environment.

At optional step 235, the processing system may obtain a verification from the at least one entity that a privacy status of the at least one of the plurality of private items is corrected. For instance, the at least one entity may send a notification asserting that the at least one entity has corrected any apparent errors in the privacy status of an item.

At optional step 240, the processing system may obtain an additional portion of the data feed. For instance, optional step 240 may comprise the same or similar operations as step 215, but with respect to an additional portion of the data feed at a subsequent time. As noted above, the data feed may continue to be obtained on an ongoing basis as the user engages in the virtual environment.

At optional step 245, the processing system may apply the additional portion of the data feed as a new input to the at least one of the plurality of detection models that is associated with the at least one of the plurality of private items. For instance optional step 245 may comprise the same or similar operations as step 220 (while being more specific to the at least one of the plurality of private items that is identified at step 225 and the particular detection model that is associated therewith).

At optional step 250, the processing system may perform one of: (A) transmitting a confirmation to the at least one entity that the at least one of the plurality of private items is not detected, in response to an output of the detection model indicative that the at least one of the plurality of private items is not detected, or (B) transmitting an additional notification to the at least one entity that the at least one of the plurality of private items is detected, in response to an output of the detection model indicative that the at least one of the plurality of private items is detected. For instance, the processing system may select from between (A) and (B) depending upon the output of the detection model, and may perform the selected action.

Following step 230 or one of optional steps 235-250, the method 200 proceeds to step 295. At step 295, the method 200 ends.

It should be noted that the method 200 may be expanded to include additional steps, or may be modified to replace steps with different steps, to combine steps, to omit steps, to perform steps in a different order, and so forth. For instance, in one example, the processing system may repeat one or more steps of the method 200, such as performing steps 210-230 on an ongoing basis until a violation of a privacy condition (e.g., incorrectly implementing a privacy setting of a private item) is detected, performing step 210-230 or steps 210-250 for other users, and so forth. In one example, the method 200 may include learning privacy preferences of the user with respect to one or more items (e.g., trigger conditions for activating and/or deactivating a privacy setting relating to an item of a particular item type, etc.). In one example, the method 200 may further include monitoring of the data feed, detecting a trigger condition, and changing the privacy settings of one or more items in response to the trigger condition. In one example, the method 200 may include obtaining an input from a user device to create and/or change a privacy setting with respect to one or more items. For instance, the input may be manually provided by the user, such as via spoken command, text input, etc. Alternatively, or in addition, the user device may learn trigger condition(s) and detect trigger condition(s). Thus, when the user device detects a trigger condition, the user device may change the privacy setting and notify the processing system, as well as one or more servers hosting the virtual environment, of the change.

In one example, the method 200 may include training one or more detection models (e.g., MLMs) for detecting various items and/or trigger conditions (e.g., events, or other conditions, such as a time of day, a location, a mode of transportation, a destination, etc.). The detection models may be user specific. Alternatively, or in addition, the detection models may be specific to the virtual environment (e.g., from among a plurality of virtual environments that are accessible to and that are accessed by the user). In this regard, the method 200 may further include gathering training data relevant to the event and that is specific to the user/user representation, type of user representation, and/or virtual environment. It should also be noted that the processing system may be for detecting privacy violations associated with at least one representation of the user extracted from different data feeds of a plurality of different virtual environments. In other words, the tracking and alerting may be performed on a virtual environment by virtual environment basis, where the data feeds from different virtual environments may be obtained by the processing system depending upon which virtual environment the user is currently experiencing. In various other examples, the method 200 may further include or may be modified to comprise aspects of any of the above-described examples in connection with FIG. 1, or as otherwise described in the present disclosure. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method 200 can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method 200 can be combined, separated, and/or performed in a different order from that described above, without departing from the example embodiments of the present disclosure.

FIG. 3 depicts a high-level block diagram of a computing system 300 (e.g., a computing device or processing system) specifically programmed to perform the functions described herein. For example, any one or more components, devices, and/or systems illustrated in FIG. 1 or described in connection with FIG. 2, may be implemented as the computing system 300. As depicted in FIG. 3, the computing system 300 comprises a hardware processor element 302 (e.g., comprising one or more hardware processors, which may include one or more microprocessor(s), one or more central processing units (CPUs), and/or the like, where the hardware processor element 302 may also represent one example of a "processing system" as referred to herein), a memory 304, (e.g., random access memory (RAM), read only memory (ROM), a disk drive, an optical drive, a magnetic drive, and/or a Universal Serial Bus (USB) drive), a module 305 for transmitting a notification that a private item is identified in a data feed of a region of a virtual environment in accordance with a plurality of detection models associated with a plurality of private items, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 302 is shown, the computing system 300 may employ a plurality of hardware processor elements. Furthermore, although only one computing device is shown in FIG. 3, if the method(s) as discussed above is implemented in a distributed or parallel manner for a particular illustrative example, e.g., the steps of the above method(s) or the entire method(s) are implemented across multiple or parallel computing devices, then the computing system 300 of FIG. 3 may represent each of those multiple or parallel computing devices. Furthermore, one or more hardware processor elements (e.g., hardware processor element 302) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 302 can also be configured or programmed to cause other devices to perform one or more operations as discussed above. In other words, the hardware processor element 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 305 for transmitting a notification that a private item is identified in a data feed of a region of a virtual environment in accordance with a plurality of detection models associated with a plurality of private items (e.g., a software program comprising computer-executable instructions) can be loaded into memory 304 and executed by hardware processor element 302 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 302) executing the computer-readable instructions relating to the above described method(s) can be perceived as a programmed processor or a specialized processor. As such, the present module 305 for transmitting a notification that a private item is identified in a data feed of a region of a virtual environment in accordance with a plurality of detection models associated with a plurality of private items (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
   obtaining, by a processing system, a list of a plurality of private items associated with a region of a virtual environment;
   obtaining, by the processing system from a server hosting the virtual environment, a data feed of the region of the virtual environment;
   applying, by the processing system, the data feed as an input to a plurality of detection models associated with the plurality of private items;
   identifying, by the processing system, at least one of the plurality of private items in the data feed via at least one output of at least one of the plurality of detection models; and
   transmitting, by the processing system, a notification to at least one entity that the at least one of the plurality of private items is identified in the data feed, wherein the at least one entity comprises the server hosting the virtual environment.

2. The method of claim 1, wherein at least a first portion of the list is obtained from a first user endpoint device of a plurality of user endpoint devices that are engaged in generating the region of the virtual environment.

3. The method of claim 2, wherein at least a second portion of the list is obtained from a second user endpoint device of the plurality of user endpoint devices.

4. The method of claim 1, wherein the obtaining the list of the plurality of private items comprises:
   learning at least one of the plurality of private items from usage data from the virtual environment associated with at least one user.

5. The method of claim 1, wherein each the plurality of detection models associated is activated when a respective user associated with the private item is engaged in the region of the virtual environment via a respective user endpoint device.

6. The method of claim 1, wherein the at least one entity further comprises:
   an endpoint device of a user that is used to access the virtual environment.

7. The method of claim 1, wherein at least one of the plurality of private items is a virtual object representing a physical object recorded via an endpoint device of a user that is used to access the virtual environment.

8. The method of claim 1, further comprising:
   obtaining a verification from the at least one entity that a privacy status of the at least one of the plurality of private items is corrected;
   obtaining an additional portion of the data feed; and
   applying the additional portion of the data feed as a new input to the at least one of the plurality of detection models that is associated with the at least one of the plurality of private items.

9. The method of claim 8, further comprising, selecting an action from among:
   transmitting a confirmation to the at least one entity that the at least one of the plurality of private items is not detected, in response to an output of the detection model indicative that the at least one of the plurality of private items is not detected; or
   transmitting an additional notification to the at least one entity that the at least one of the plurality of private items is detected, in response to an output of the detection model indicative that the at least one of the plurality of private items is detected.

10. The method of claim 1, wherein at least a second one of the plurality of private items is encrypted and included as an invisible light area in the data feed of the region of the virtual environment.

11. A non-transitory computer-readable medium storing instructions which, when executed by a processing system including at least one processor, cause the processing system to perform operations, the operations comprising:

obtaining a list of a plurality of private items associated with a region of a virtual environment;

obtaining, from a server hosting the virtual environment, a data feed of the region of the virtual environment;

applying the data feed as an input to a plurality of detection models associated with the plurality of private items;

identifying at least one of the plurality of private items in the data feed via at least one output of at least one of the plurality of detection models; and transmitting a notification to at least one entity that the at least one of the plurality of private items is identified in the data feed, wherein the at least one entity comprises the server hosting the virtual environment.

12. The non-transitory computer-readable medium of claim 11, wherein at least a first portion of the list is obtained from a first user endpoint device of a plurality of user endpoint devices that are engaged in generating the region of the virtual environment.

13. The non-transitory computer-readable medium of claim 12, wherein at least a second portion of the list is obtained from a second user endpoint device of the plurality of user endpoint devices.

14. An apparatus comprising:

a processing system including at least one processor; and a computer-readable medium storing instructions which, when executed by the processing system, cause the processing system to perform operations, the operations comprising:

obtaining a list of a plurality of private items associated with a region of a virtual environment;

obtaining, from a server hosting the virtual environment, a data feed of the region of the virtual environment;

applying the data feed as an input to a plurality of detection models associated with the plurality of private items;

identifying at least one of the plurality of private items in the data feed via at least one output of at least one of the plurality of detection models; and transmitting a notification to at least one entity that the at least one of the plurality of private items is identified in the data feed, wherein the at least one entity comprises the server hosting the virtual environment.

15. The apparatus of claim 14, wherein at least a first portion of the list is obtained from a first user endpoint device of a plurality of user endpoint devices that are engaged in generating the region of the virtual environment.

16. The apparatus of claim 15, wherein at least a second portion of the list is obtained from a second user endpoint device of the plurality of user endpoint devices.

17. The apparatus of claim 14, wherein the obtaining the list of the plurality of private items comprises:

learning at least one of the plurality of private items from usage data from the virtual environment associated with at least one user.

18. The apparatus of claim 14, wherein each the plurality of detection models associated is activated when a respective user associated with the private item is engaged in the region of the virtual environment via a respective user endpoint device.

19. The apparatus of claim 14, wherein the at least one entity further comprises an endpoint device of a user that is used to access the virtual environment.

20. The apparatus of claim 14, wherein at least one of the plurality of private items is a virtual object representing a physical object recorded via an endpoint device of a user that is used to access the virtual environment.

\* \* \* \* \*